United States Patent
Cooney et al.

(10) Patent No.: US 9,727,907 B2
(45) Date of Patent: Aug. 8, 2017

(54) SYSTEM AND METHOD FOR ASSOCIATING ITEM LISTS WITH GEOGRAPHICAL LOCATIONS

(71) Applicant: W.W. GRAINGER, INC., Lake Forest, IL (US)

(72) Inventors: Michael Cooney, Evanston, IL (US); Daniel S. Grimm, Chicago, IL (US); William Gillespie, Libertyville, IL (US); Ismael Moustafa, Chicago, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 13/796,517

(22) Filed: Mar. 12, 2013

(65) Prior Publication Data
US 2014/0279210 A1    Sep. 18, 2014

(51) Int. Cl.
*G06Q 30/00*     (2012.01)
*G06Q 30/06*     (2012.01)

(52) U.S. Cl.
CPC ..... *G06Q 30/0633* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 6,563,430 B1 | 5/2003 | Kemink et al. | |
| 6,618,683 B1* | 9/2003 | Berstis | G01C 21/165 340/10.1 |
| 7,315,830 B1* | 1/2008 | Wirtz et al. | 705/14.1 |
| 7,424,447 B2* | 9/2008 | Fuzell-Casey et al. | 705/26.81 |
| 7,668,754 B1* | 2/2010 | Bridgelall | 705/26.9 |
| 7,768,395 B2 | 8/2010 | Gold | |
| 7,890,376 B2* | 2/2011 | Barrese et al. | 705/26.9 |
| 8,140,398 B1* | 3/2012 | Boesjes | 705/26.1 |
| 8,175,925 B1* | 5/2012 | Rouaix | G06Q 20/203 705/22 |
| 8,244,594 B2* | 8/2012 | Barron et al. | 705/26.1 |
| 8,341,029 B1* | 12/2012 | Ramalingam et al. | 705/26.1 |
| 8,355,961 B1* | 1/2013 | Ng et al. | 705/28 |
| 8,600,835 B1* | 12/2013 | Lueck | 705/26.8 |
| 8,626,611 B2* | 1/2014 | Bravo | 705/26.9 |

(Continued)

OTHER PUBLICATIONS

McCrea, B., Feb. 2012. The GPS of the Supermarket. Black Enterprise, 42(7), pp. 38-39.*

(Continued)

*Primary Examiner* — Jason Dunham
*Assistant Examiner* — Brittany Bargeon
(74) *Attorney, Agent, or Firm* — Greenberg Traurig, LLP

(57) ABSTRACT

A current geographic location of a mobile device, such as a smart phone, tablet computer, or the like, is used to retrieve one or more lists of product related items, such as information related to product that has been delivered/shipped to one or more locations in the vicinity of the current geographic location of the mobile device. The lists of product related items provide details about the product related items and a user interface element for allowing, among other things, items to be ordered, e.g., for delivery/shipment to a corresponding geographic location.

4 Claims, 4 Drawing Sheets

(56) References Cited

U.S. PATENT DOCUMENTS

| | | | |
|---|---|---|---|
| 2002/0065828 A1* | 5/2002 | Goodspeed | 707/100 |
| 2004/0093274 A1* | 5/2004 | Vanska et al. | 705/26 |
| 2005/0246238 A1* | 11/2005 | Dvorak | 705/26 |
| 2007/0022021 A1* | 1/2007 | Walker et al. | 705/26 |
| 2009/0287587 A1* | 11/2009 | Bloebaum et al. | 705/27 |
| 2010/0082447 A1* | 4/2010 | Lin et al. | 705/26 |
| 2010/0262554 A1* | 10/2010 | Elliott | G01C 21/20 705/323 |
| 2010/0299188 A1* | 11/2010 | Karnalkar et al. | 705/14.1 |
| 2011/0029370 A1* | 2/2011 | Roeding | G06Q 30/00 705/14.38 |
| 2011/0131084 A1* | 6/2011 | Shanahan | 705/14.4 |
| 2012/0123673 A1* | 5/2012 | Perks et al. | 701/426 |
| 2012/0259732 A1* | 10/2012 | Sasankan et al. | 705/26.9 |
| 2013/0191246 A1* | 7/2013 | Calman et al. | 705/26.9 |

OTHER PUBLICATIONS

McCrea, B., Feb. 2012, The GPS of the Supermarket, Black Enterprise, 42(7), pp. 38-39.*

\* cited by examiner

SYSTEM AND METHOD FOR ASSOCIATING ITEM LISTS WITH GEOGRAPHICAL LOCATIONS

BACKGROUND

Systems and methods that use geographical location information to provide various types of services are generally known in the art. For example, U.S. Pat. No. 7,768,395 describes a system that provides location dependent brand mapping services on a computing device such as a smart phone and U.S. Pat. No. 6,563,430 describes a system that provides location dependent user interfaces on a computing device such as a remote control. In the exemplary systems described in these patents (which patents are incorporated herein by reference in their entirety), the location determination is effected using any number of commonly available techniques, such as direct entry (e.g., manual entry of an address), relative positioning, and/or absolute positioning (e.g., as determined via use of a GPS device).

SUMMARY

The following describes a system and method that uses a current geographic location of a mobile device, such as a smart phone, tablet computer, or the like, to retrieve one or more lists of product, product related services, and/or other product related information (such as images, notes, inventory, etc.) that pertains to a geographic location (individually and collectively referred to herein as "items"). The lists of product related items provide details about the product related items and a user interface element for allowing, among other things, items to be ordered, e.g., for delivery/shipment to a corresponding geographic location, to another geographic location and/or for pickup at a given location.

A better understanding of the objects, advantages, features, properties and relationships of the systems and methods described hereinafter will be obtained from the following detailed description and accompanying drawings which set forth illustrative embodiments.

BRIEF DESCRIPTION OF THE DRAWINGS

For a better understanding of the system and method for associating item lists with geographical locations described hereinafter reference may be had to preferred embodiments shown in the following drawings in which.

DETAILED DESCRIPTION

With reference to the figures, exemplary systems and methods for associating one or more item lists with a geographical location are now described.

Figure 1:
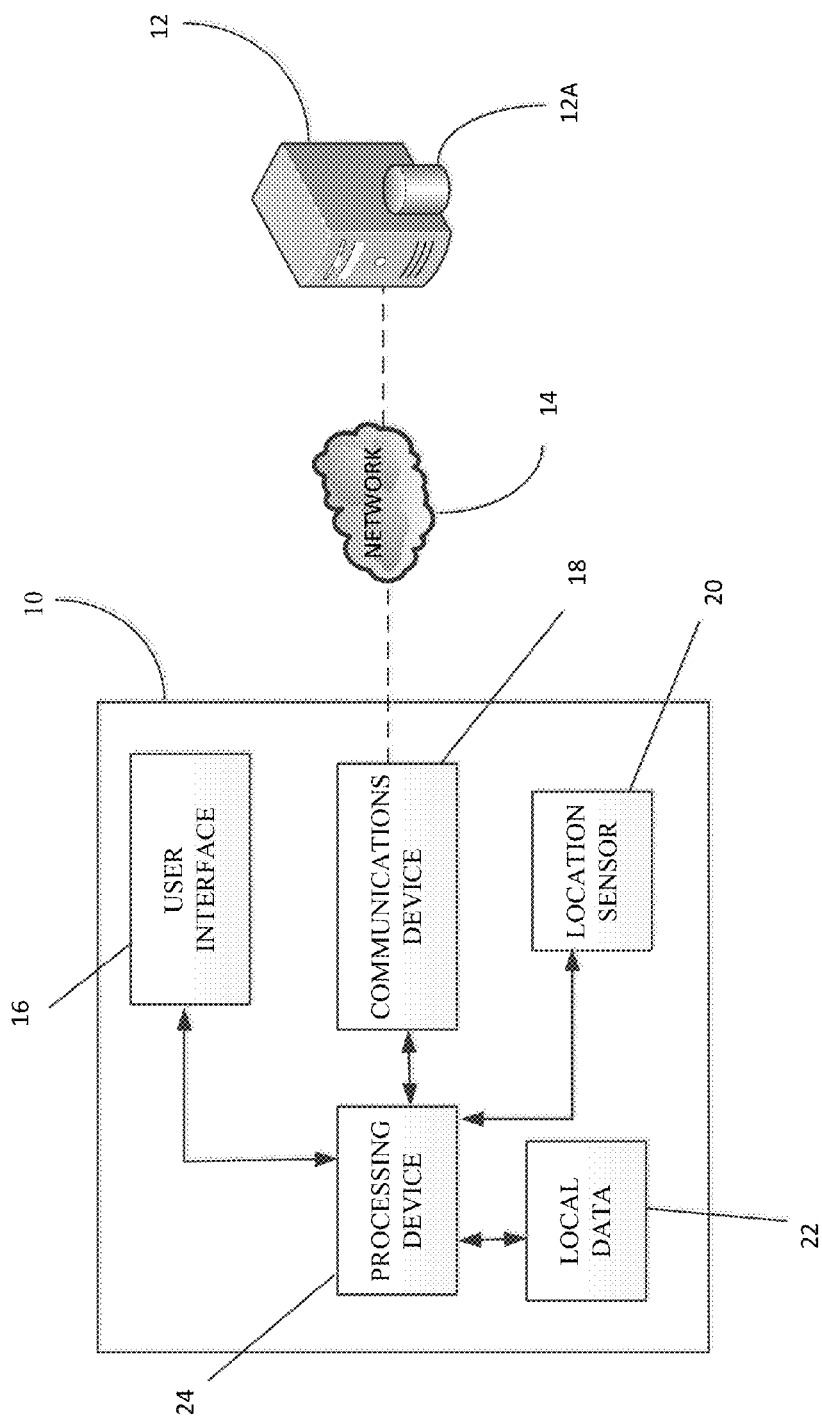
FIG. 1 illustrates a block diagram on an exemplary mobile device in an exemplary system in which item lists are associated with geographical locations.

FIG. 1 illustrates a block diagram of an exemplary system for associating one or more item lists with a geographical location. As will be described in greater detail hereinafter, the system includes a mobile device 10, such as a smart phone, tablet computing device, or the like, which may communicate, as necessary, with a server device 12, having an associated data repository 12A. Communications between the mobile device 10 and server device 12 may be made via a network 14, such as a local area network and/or a wide area network. As further illustrated in FIG. 1, the mobile device 10 preferably includes components that are conventionally included in a mobile computing device such as, by way of example only, a user interface component 16 (e.g., a touch screen display), a communications device 18 (e.g., RF, IR, and/or other protocol type receiver, transmitter, and/or transceiver), a location sensing device 20, a local data store 22 (e.g., RAM, ROM, and/or other physically embodied memory devices/computer-readable memory) having stored thereon data, processor executable instructions (e.g., apps), and/or the like, and a processing device 24 to control the operations of the various elements. Generally, the location sensing device 20 provides a location parameter to the processing device 24 and the processing device 24 initiates a retrieval of information that has been associated with the location parameter for display in the user interface 16. The location parameter may be an absolute location coordinate, such as a latitude and longitude, a relative location, such as within the vicinity of a known location coordinate, and/or a descriptive location, such as the name of a location. Within the local data store 22 and/or the remote data store 12A such location parameters will be cross-referenced to the information that is to be retrieved therefrom. It will be additionally appreciated that this description is not intended to be limiting. For example it will be understood that the mobile device 10 may also include a subset of above-described components, e.g., a display, location sensing device, a processing device, and a transceiver, with the mobile device 10 then being adapted to use information and/or programs stored on other devices, such as in a cloud computing environment. An exemplary mobile device 10 may therefore also be a pair of "Google" brand glasses.

Figure 2:
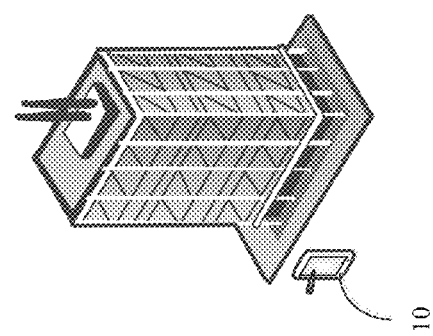
FIG. 2 illustrates exemplary methods for obtaining geographic location information for use in the system of FIG. 1.
Figure 2:
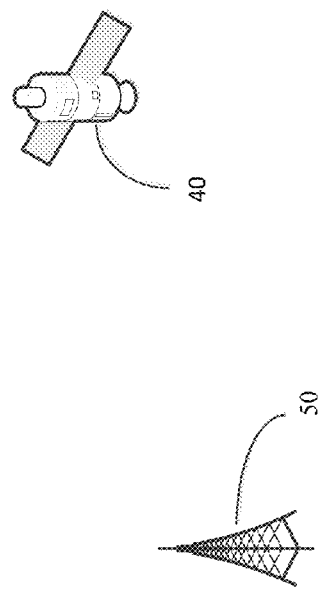
Figure 2:
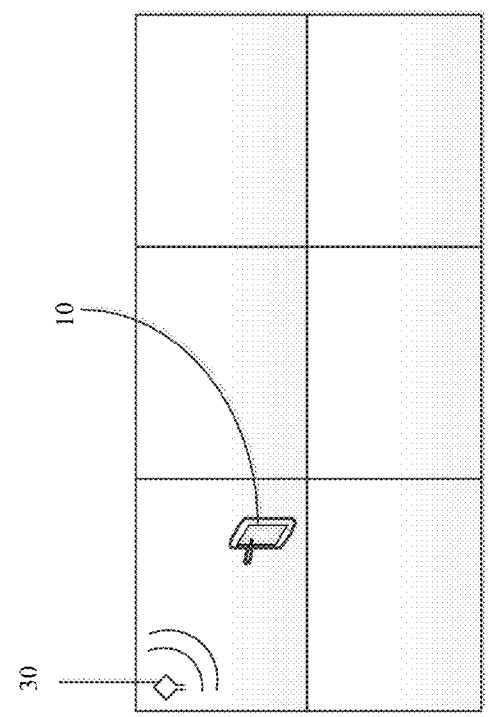
Figures 3, 4, 5:
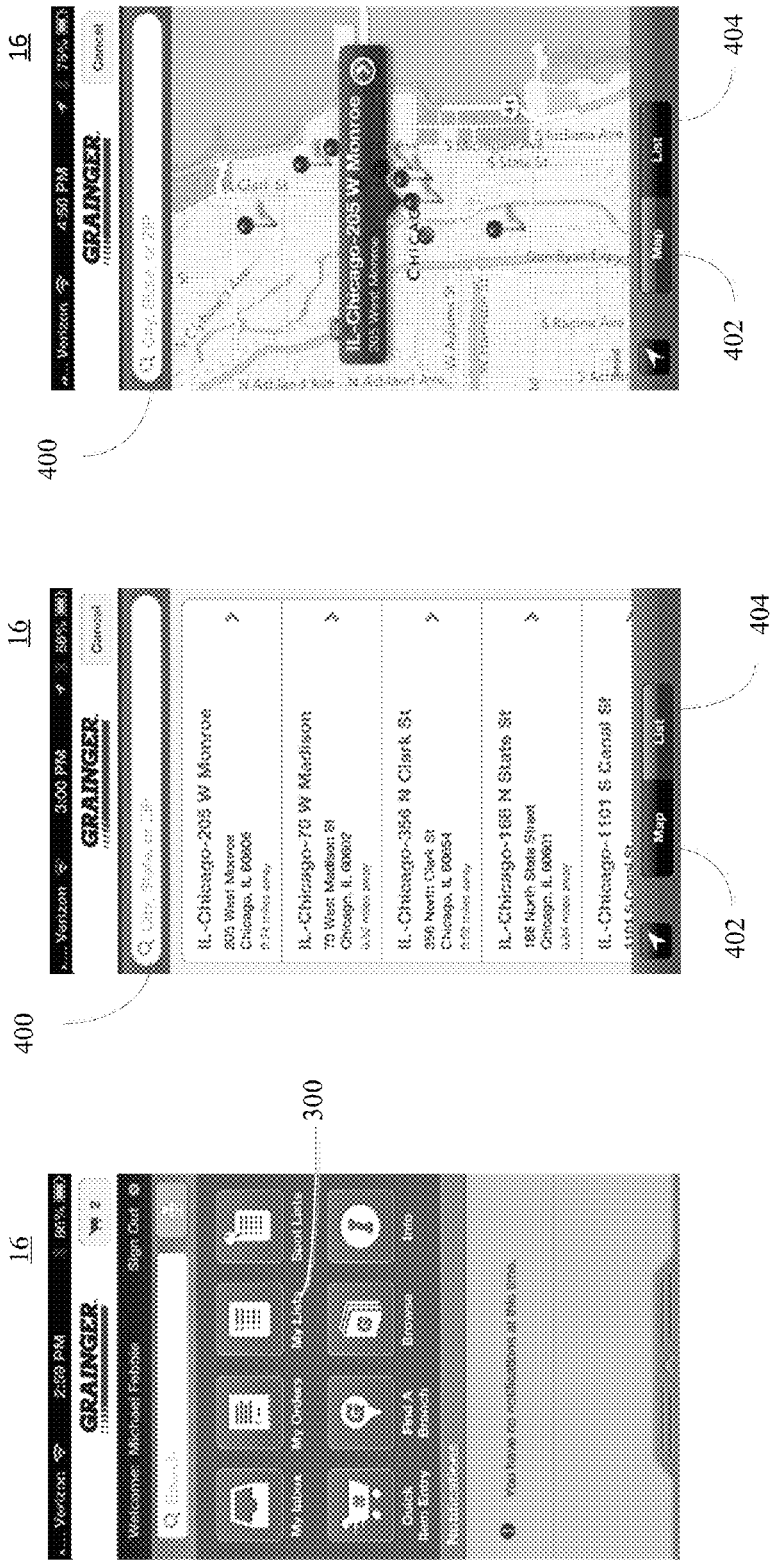
FIGS. 3-7 illustrate screen shots of exemplary user interfaces presented by the system of FIG. 1.

FIG. 2 illustrates an example implementation of a system for associating lists of items with a geographical location. In the illustrative example, as a mobile device 10 is carried by a user, various means may be used to determine the location of the mobile device 10. In one example, as the user enters a room or other defined area within a building, e.g., a boiler room, the location sensing device 20 detects an emission from an emitter 30 that is disposed in the vicinity of the room. The detection of the emission from the emitter 30 may be automatic or the detection may be made in response to a user interaction with the mobile device 10, for example by the user activating the "my lists" link 300 in the "Grainger" app that is being executed on mobile device 10 as illustrated in FIG. 3. In any case, when the emission from the emitter 30 is detected, the location sensing device 20 in the mobile device 10 notifies the processing device 24 in the mobile device 10 that it is in the vicinity of the emitter 30 that is associated with the room and the processing device 24 in the mobile device can then issue a query, using data received from the emitter 30 or data that is otherwise cross-referenced to data received from the emitter 30, to one or both of the information sources 12A, 22 for the purpose of retrieving one or more lists that are associated with the room, e.g., one or more lists that have been cross-referenced to the data that is representative of the room.

Figure 6:
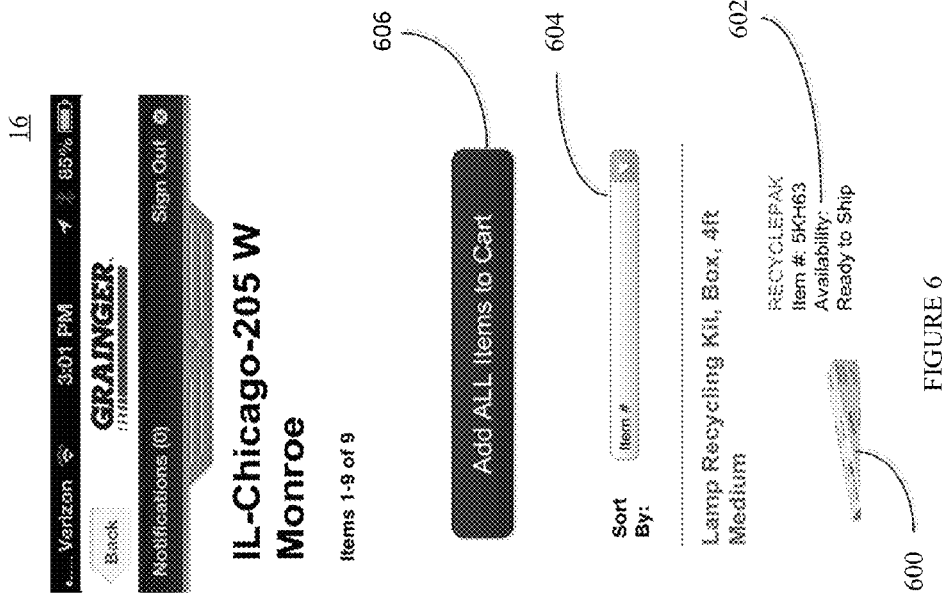

In keeping with this example, the information sources 12A and/or 22 may provide a listing of product that has been installed in the relevant location, a listing of product that has been previously purchased for use in the relevant location, a listing of parts for product that has been installed in or purchased for use in the relevant location, a listing of product that has been manually assigned to the relevant location, a listing of product that has been delivered to/shipped to the relevant location, etc. In any case, the listing of product, parts or the like will be crossed-referenced to data that is indicative of the relevant location, such as a latitude/longitude, an emitter identifier, etc. As shown in FIG. 6, a listing of product may further include one or more pictures 600 of one or more products, textual item descriptors 602, one or more pictures of one or more products as installed in the relevant location, links 606 for use in purchasing product, e.g. to add individual product or all listed product to a shopping cart, links to other information related to the product (links to further pictures, data sheets, installation instructions, and other content as desired), links for accessing product availability/inventory information, links for accessing shipping and/or pickup information, links for accessing branch information, links and/or fields for allowing a user to add notes to the list, etc. Any such retrieved information would be displayed in the user interface 16 and user interface elements 604 may be additionally provided to allow a user to sort or otherwise filter lists as desired. Any information captured from the user would also be stored in the data repository in association with the relevant list.

As noted above, the lists may be manually created, e.g., a user can manually associate geographical location information (whether absolute, relative, or manually provided) with one or more products and/or product related content. The lists may also be automatically created, e.g., geographical location information can be captured by a mobile device when an order for product is placed and the product can thereafter be included in a list that is associated with the captured geographical location information. Lists may also be automatically created using ship to or deliver to information and the like without limitation. Information that is included in the lists or otherwise accessible via use of the lists can be user provided information (e.g., information uploaded to the server 12 and/or locally stored on mobile device 10) and/or vendor provided information as desired.

In addition to providing direct accesses to the aforementioned one or more lists, it is contemplated that mobile device can use the location information as obtained from the emitter(s) 30 to provide a user with access to a floor plan diagram or like. In this manner, a user can interact with the floor plan diagram, e.g., via the touch screen or graphical display, to access one or more lists associated with a user specified location, e.g., a specified room in a facility. In further circumstances, the location parameter may also include data indicative of an orientation or pointing direction of the mobile device 10, so that, for example, as a user pans around a room subsets of lists associated with that room may be provided to the user in user interface 16, e.g., product included in a circuit breaker box can be shown when the mobile device is oriented to face a first wall of a room and product included in a water closet can be shown when the mobile device is oriented to face a second wall of the room. In any event, it is to be understood that the techniques that are used for presenting text, drawings, images, and associated options in the user interface 16 are common to one of ordinary skill in the art, and include for example, the use of hypertext markup language, HTML, that is used to display pages of information with links to other information or processes.

It will also be appreciated that the lists presented to the user may be dependent upon other external parameters, such as the time of day, the time of the year, and the like. For example, a list of product for a discerned location may be seasonally adjusted, adjusted based on product availability, etc. Similarly, the lists presented may be based upon a current user of the mobile device. For example, a list of product for a location may be role adjusted (e.g., one list for Paul the plumber and one list for Ed the electrician). Methods for discerning a user of a mobile device, such as log-in methods, biometric methods, etc. are known in the art and need not be described herein for the sake of brevity.

As further illustrated in FIG. 2, a mobile device 10 may additionally (or alternatively) obtain geographic location information via use of a GPS satellite system 40, cellular phone system 50, or the like without limitation. Furthermore, the user may be provided the option of entering the location parameter directly, thereby eliminating the need for beacons in all or some of the locations. For example, the user interface 16 may provide a "location" option, wherein the user enters a location, selects from among a predefined list of named locations, etc. Alternatively, or in addition, the mobile device 10 could contain a voice recognition device, and the user could say the name of a location, such as "boiler room," "Plant A," etc., that will be used by the mobile device 10 to determine the location parameter. The location sensing system could also contain a relative location sensing device such as accelerometer that is used to determine the movements of the mobile device 10 relative to a predefined reference point, such as the location of building entranceway. In such an embodiment, the mobile device 10 determines the location parameter based on movements relative to the reference point. These and other techniques for determining or defining a location parameter and associating it with a physical area or region are common to one of ordinary skill in the art.

FIG. 4 illustrates an example in which a user is presented with a plurality of lists from which the user can select a particular list of interest for display as described above. In the illustrated example, the plurality of lists are sorted and displayed based on a current geographical location of the mobile device 10, e.g., in a descending order from closest to furthest considering the current location of the mobile device 10. In further circumstances, the lists to be included in the presented plurality of lists can be limited to a given number, limited to only those lists within a given distance from the current location of the mobile device 10, e.g., within 50 miles, and the like. It will be appreciated that given locations may also provide access to multiple lists (e.g. 500 W Madison could have sub lists for $16^{th}$ floor, $15^{th}$ floor or by Lighting, Electrical, etc.) A user interface element 400 can be provided to allow for location based searching and user interface elements 402 and 404 can be provided to allow the user to toggle between a list view as shown in FIG. 4 and a map view as shown in FIG. 5. In the map view of FIG. 5, wherein the map is preferably centered on the current location of the mobile device 10, a user can likewise interact with a displayed location, e.g., clicking on a pin placed on the map, to access the one or more lists associated with that location as described above.

Figure 7:
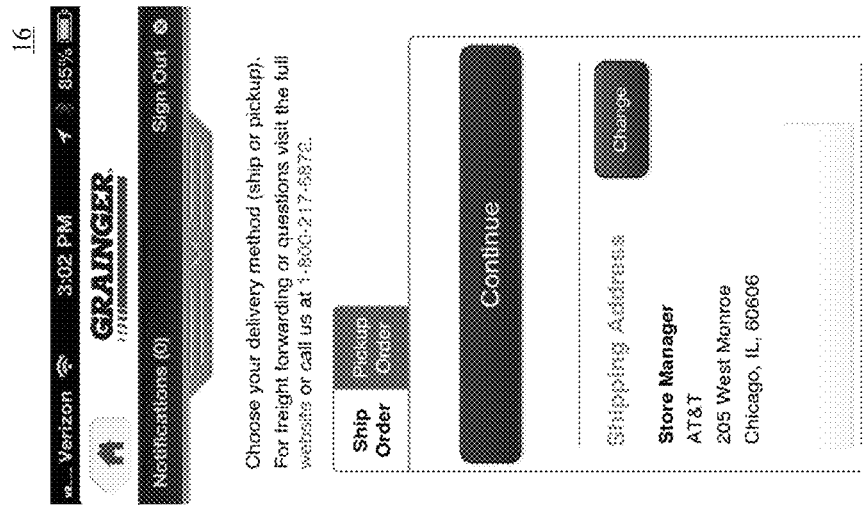

FIG. 7 illustrates an example in which a geographical attribute associated with a list, particularly a product in a list, is automatically applied to another system action. For example, in response to the user adding the "lamp recycling kit" as shown in FIG. 6 to a shopping cart, the geographical location associated with the list which includes the "lamp recycling kit" is used to automatically populate the shipping address as shown in FIG. 7. It is similarly contemplated that the user's current geographical location could be used to automatically populate a shipping address or to select a pick up branch location, preferably one having stock in inventory, that is closest to the user's current geographical location.

Preferably user interface elements are provided to allow the user to verify and/or edit any such automatically applied actions.

While various embodiments of the invention have been described in detail, it will be appreciated by those skilled in the art that various modifications and alternatives to those details could be developed in light of the overall teachings of the disclosure. For example, while described in the context of lists of product, it will be appreciated that the geographically based lists of items could be lists of services, e.g., a list of renewable warranty services for product at a given geographical location, a list of preferred service technicians for product at a given geographical location, etc., and/or other information such as images of product, product installations, etc., notes, inventory in the vicinity of a given geographical locations, and the like without limitation. Accordingly, the particular arrangements disclosed are meant to be illustrative only and not limiting as to the scope of the invention which is to be given the full breadth of the appended claims and any equivalents thereof.

What is claimed is:

1. A method for using a mobile device to provide access to at least one list of product related items, comprising:
    receiving by a mobile device a signal from a location signaling device;
    providing at least the signal received from the location signaling device to a location sensing device of the mobile device whereby the location sensing device of the mobile device uses the at least the signal received from the location signaling device to determine a current location of the mobile device;
    receiving from the mobile device at a server device a communication containing a current location data wherein the current location data is indicative of the current location of the mobile device as determined by the location sensing device of the mobile device;
    selecting by the server device from within an associated data store in which was previously stored a plurality of list of products that were each cross-referenced to a one of a plurality of location data a one of the plurality of lists of products that was cross-referenced to a one of the plurality location data that generally corresponds to the data indicative of the current location of the mobile device;
    providing from the server device to the mobile device the selected one of the plurality of lists of products; and
    causing the mobile device to display in a user interface presented in a display of the mobile device the selected one of the plurality of lists of products;
    wherein the user interface comprises a user interface element for initiating from the mobile device an ordering of at least one product from the selected one of the plurality of lists of products;
    wherein each one of the plurality of list of products and each corresponding one of the plurality of location data previously stored within the data store was received by the server device from the mobile device while the mobile device was at a location corresponding to the corresponding one of the plurality of location data; and
    wherein each of the plurality of location data previously stored in the data store was determined by a location sensing device of the mobile device via use of at least a signal received from a location signaling device.

2. The method as recited in claim 1, wherein the step of receiving by the mobile device the signal from the location signaling device comprises receiving by the mobile device a positioning signal generated by a global positioning satellite.

3. The method as recited in claim 1, wherein the step of receiving by the mobile device the signal from the location signaling device comprises receiving by the mobile device a positioning signal generated by a beacon device.

4. The method as recited in claim 1, wherein the location sensing device of the mobile device additionally uses a signal generated by an accelerometer of the mobile device when determining the current location of the mobile device and wherein the plurality of location data stored in the data store were also determined by the location sensing device of the mobile device via additional use of at least a signal generated by an accelerometer of the mobile device.

\* \* \* \* \*